US010356491B2

(12) United States Patent
Hoeben et al.

(10) Patent No.: US 10,356,491 B2
(45) Date of Patent: Jul. 16, 2019

(54) SYSTEMS AND METHODS FOR VIRTUAL SET-TOP SUPPORT OF AN HTML CLIENT

(71) Applicant: ActiveVideo Networks, Inc., San Jose, CA (US)

(72) Inventors: Maarten Hoeben, Amersfoort (NL); Ronald Brockmann, Los Gatos, CA (US)

(73) Assignee: Active Video Networks, Inc., San Jose, CA (US)

( * ) Notice: Subject to any disclaimer, the term of this patent is extended or adjusted under 35 U.S.C. 154(b) by 0 days.

(21) Appl. No.: 15/851,589

(22) Filed: Dec. 21, 2017

(65) Prior Publication Data

US 2018/0184178 A1 Jun. 28, 2018

Related U.S. Application Data

(60) Provisional application No. 62/438,946, filed on Dec. 23, 2016.

(51) Int. Cl.
*H04N 21/81* (2011.01)
*H04N 21/2343* (2011.01)
*H04N 21/4782* (2011.01)
*H04N 21/643* (2011.01)
(Continued)

(52) U.S. Cl.
CPC ....... *H04N 21/8173* (2013.01); *G06F 16/986* (2019.01); *H04N 21/2343* (2013.01); *H04N 21/4782* (2013.01); *H04N 21/643* (2013.01); *H04N 21/8543* (2013.01)

(58) Field of Classification Search
CPC .......... H04N 21/8173; H04N 21/2343; H04N 21/4782; H04N 21/643; H04N 21/8543; G06F 17/30896
See application file for complete search history.

(56) References Cited

U.S. PATENT DOCUMENTS

| 6,310,601 B1 * | 10/2001 | Moore ............. G06F 17/30905 345/660 |
| 8,914,813 B1 * | 12/2014 | Sigurdsson ....... G06F 17/30899 719/328 |
| 2001/0027563 A1 | 10/2001 | White et al. |

(Continued)

FOREIGN PATENT DOCUMENTS

| GB | 2479164 A | * 10/2011 | .......... H04L 65/602 |
| GB | 2479164 A | 10/2011 | |

OTHER PUBLICATIONS

ActiveVideo Networks, Inc., International Search Report and Written Opinion, PCT/US2017/068293, dated Mar. 19, 2018, 7 pgs.

*Primary Examiner* — Randy A Flynn
(74) *Attorney, Agent, or Firm* — Morgan, Lewis & Bockius LLP

(57) ABSTRACT

A server remote from client device executes an HTML-based virtual client application. Using the HTML-based virtual client application, the server renders an image corresponding to a video frame. The rendered image includes HTML commands. The server generates an HTML wrapper for the rendered image. Generating the HTML wrapper includes converting the HTML commands to HTML primitives that are selected from a subset of available HTML commands. The server sends the HTML wrapper to the client device to be processed by an HTML-based application on the client device to enable the image to be displayed.

13 Claims, 15 Drawing Sheets

(51) Int. Cl.
*H04N 21/8543* (2011.01)
*G06F 16/958* (2019.01)

(56) References Cited

U.S. PATENT DOCUMENTS

| | | | |
|---|---|---|---|
| 2004/0216045 | A1 | 10/2004 | Martin et al. |
| 2006/0184614 | A1* | 8/2006 | Baratto ..................... G06F 3/14 709/203 |
| 2011/0173590 | A1* | 7/2011 | Yanes ................. G06F 11/3664 717/125 |
| 2013/0254675 | A1* | 9/2013 | de Andrade ............ H04L 69/08 715/746 |
| 2013/0276015 | A1* | 10/2013 | Rothschild ......... H04N 21/2387 725/25 |
| 2016/0142468 | A1* | 5/2016 | Song ..................... H04L 67/025 709/218 |
| 2016/0357583 | A1* | 12/2016 | Decker ............... G06F 9/44526 |
| 2017/0078721 | A1* | 3/2017 | Brockmann ....... H04N 21/8456 |

\* cited by examiner

SYSTEMS AND METHODS FOR VIRTUAL SET-TOP SUPPORT OF AN HTML CLIENT

RELATED APPLICATION

This application claims priority and benefit to U.S. Provisional Application No. 62/438,946, filed Dec. 23, 2016, entitled "Systems and Methods for Virtual Set-top Support of an HTML Client," which is hereby incorporated by reference in its entirety.

TECHNICAL FIELD

The present disclosure relates to the creation of an encoded video sequence, and more particularly to using scene information for encoding the video sequence and decomposing and sending the video sequence in a simplified HTML-encapsulated format that can be rendered by multiple generations of (e.g., any generation of) an HTML-language-based software application.

BACKGROUND

Many consumer electronic devices (i.e., client devices) nowadays, such as television set-top boxes (STBs), smart TVs, smart phones, and tablets, have some sort of HTML browser that is capable of rendering at least a subset of the HTML language. These browsers are often slow and not completely standards-compliant, with almost every browser implementation having its own shortcomings. This lack of compliance impedes the original proposition of what is currently the most recent version of HTML, known as HTML5. This version promised a standardized set of APIs and protocols to run an application (at least partially) client-side using a combination of markup and JavaScript. Hence, a standardized application execution environment via the complex family of HTML5 languages usually does not work well for these devices. Although STBs and smart TVs have become considerably more powerful, so have the requirements to implement a complex standards-compliant browser. Moreover, the browser is usually added as a 'good enough' addition to the software running on each device, reflecting a preference for application SDKs such as for example Google's Android or Apple's iOS SDK over a high-quality browser-based approach.

The inadequacy of embedded browser technology presents a problem in reliably executing applications, within these browser environments, as hosts for certain user-interface applications. One way of solving the shortcomings of simple, low-capability browser environments is by running the applications on a server and outputting HTML pages (of fragments thereof), or updating the HTML document object model (DOM) using JavaScript. Although this alleviates the client from running complex logic, it still leaves significant layout and rendering to be done by the client. Not only is this slow on some clients, lack of standards compliancy and software bugs force the application developer to use the common set of supported primitives of the HTML language between all clients.

It is known to encode and transmit multimedia content for distribution within a network. For example, video content may be encoded as MPEG or H.264/5 video wherein pixel-domain data is converted into a frequency-domain representation, quantized, entropy encoded, and placed into an appropriate transport format (e.g., MPEG transport stream). The video stream can then be transmitted to a client device, decoded, and returned to the spatial/pixel domain for display on a display device.

The encoding of the video may be spatial, temporal, or a combination of both. Spatial encoding generally refers to the process of intra-frame encoding wherein spatial redundancy (information) is exploited to reduce the number of bits that represent a spatial location. Spatial data is converted into a frequency domain over a small region. In general, for small regions it is expected that the data will not drastically change and therefore in the region much of the information will be stored in low-frequency components with the higher-frequency components being at or near zero. Thus, the lack of high-frequency information in a small area is used to reduce the representative data size. Data may also be compressed using temporal redundancy. One method for exploiting temporal redundancy is through the calculation of motion vectors. Motion vectors establish how objects or pixels move between frames of video. Thus, a ball may move between a first frame and a second frame by several pixels in a specific direction. Thus, once a motion vector is calculated, the information about the spatial relocation of the ball information from the first frame to the second frame can be used to reduce the amount of information that is used to represent the motion in an encoded video sequence. In practical applications the motion vector is rarely a perfect match and an additional residual pixel representation is used to compensate for the imperfect temporal reference.

Motion-vector calculation is a time-consuming and processor-intensive step in compressing video content. Typically, a motion-search algorithm is employed to attempt to match elements within the video frames and to define motion vectors that point to the new location to which objects or portions of objects have moved. This motion search algorithm tries to find for each macroblock the optimal representation of that macroblock in past and/or future reference frames, and determines the vector to represent that temporal relation. The motion vector is subsequently used to minimize the residual pixel information that is compressed in the compression process. It would be beneficial if a mechanism existed that assists in the determination of these motion vectors.

Another time-consuming and processor-intensive component of the encoding process for more advanced codecs is the process to find the optimal macroblock type, partitioning of the macroblock, and the weighing properties of the slice. H.264, for example, has four of 16×16, nine of 8×8 and nine of 4×4 luma intra-prediction modes and four 8×8 chroma intra-prediction modes, and inter-macroblocks can be partitioned from as coarse as 16×16 to as fine grained as 4×4. In addition, it is possible to assign a weight and offset to the temporal references. A mechanism that defines or assists in finding these parameters directly would improve scalability.

Many of these complex video encoding/decoding concerns are, for the purposes of ordinary video program encoding and playback, addressed in hardware (e.g., by silicon chips). However, to utilize advanced capabilities of video encoding/decoding to aid a remote application in effectively serving a client device, these functions need to be executed outside of a hardware solution. Hence, the difficulty is substantial to exploit powerful image processing subsystems in an application software environment outside of hardware support. When considering the minimal computing power of many client-side consumer electronics devices, it would not be possible to execute an application that depends on such capabilities in the client.

SUMMARY

A solution to the problems identified above is to run the client in the cloud, with output of the application being encoded and streamed as video along with certain software commands to assist in reconstructing various image components and properly rendering the result. The user interacting with the client of such systems will perceive the application that they are interacting with to be executing in the client whereas the actual execution is taking place on a remote server. The premise is that the client device would only need a minimal subset of support functions (e.g., the implementation of a return channel for user input) and that the complex function of displaying the user-interface (UI) elements was done by the device's common capability to display a low-delay video stream. In practice, however, more and more functionality has been added to the client device to make this work for a variety of use cases (such as to work around the device's latency, handle interactivity versus buffering (which adds delay to interactions of the user), achieve a user interface that is blended with video overlays, implement digital rights management (DRM) functions, etc.), so the promise of just requiring an ultra-thin client that essentially only decodes video to support such a system is increasingly less desirable.

However, by leveraging existing software on a client device (e.g., a set-top box), such as a simple browser, and providing simplified commands from a cloud-based application server, a true 'run anywhere' paradigm can be realized that can be executed on typical client devices. Complex HTML logic and commands are translated to simplified HTML commands that can be execute by multiple generations (e.g., essentially any generation) of an HTML-based program in an efficient manner such that the server-side execution of a complex HTML application can be tracked and decomposed into more primitive HTML elements that can be interpreted and results rendered on most devices (e.g., virtually any device) with an HTML browser system. This so-called simplified HTML can be defined as the subset of HTML commands that in common can be executed by a plurality of HTML browsers that run multiple generations (e.g., almost any generation) of the HTML language in current use on media playback devices (e.g., from different manufacturers) such as set-top boxes, smart TVs, mobile phones, tablets, and personal computers, among other devices capable of executing HTML commands.

In some embodiments, a fully standard-compliant HTML browser is run in the cloud and its rendered output is converted to a subset of HTML primitives and associated images so the target client device's browser need only handle these primitives and draw respective images. For example, the output in the virtual display is encoded to several non-overlapping dirty rectangles, which are sent to the client device and decoded on an HTML canvas in the device's memory.

Another approach is to traverse the Document Object Model (DOM) and group-related DOM nodes and convert them into images that can be transferred to the client and reused in a temporal manner. Rendering engines (e.g., Apple's Webkit or Google's Blink) already do this to facilitate GPU-assisted compositing of webpages, the idea being that for most screen updates (such as animations and scrolling) the pixel representations of these grouped DOM nodes do not change and once texture material is passed to the GPU it can be composited much more efficiently than when all rendering is done by the CPU without the additional support of the GPU. This also advantageously offloads the CPU for other tasks. This concept, with similar benefits, is also applicable to the model described above. The standard-compliant HTML browser running server-side (i.e., running in the cloud) uses the client device's HTML browser as just a graphics engine with similar properties as a GPU. In some embodiments, because texture updates are expensive in terms of network bandwidth and delay, DOM nodes are grouped into textures, transferred to the device's browser, and used in a temporal fashion by reusing the images, stored in a cache, to render multiple frames.

In some embodiments, instead of defining a protocol, and having a fixed client uploaded that implements the client side of the protocol, JavaScript and images are streamed to the client device. The JavaScript programmatically updates the DOM and/or manipulates the canvas(es) and may be generated on a frame by frame base. No predefined protocol or fixed client code, other than an initial bootstrapping HTML page, is used.

In accordance with some embodiments, a method is provided for creating a composited video-frame sequence for an application wherein the video-frame sequence is encoded per a predetermined specification, such as MPEG-2, H.264 or other block-based encoding protocol or variant thereof. A current scene state for the application is compared to a previous scene state wherein each scene state includes a plurality of objects. A video construction module determines if properties of one or more objects have changed (e.g., the object's position, transformation matrix, texture, translucency, etc.) based upon a comparison of the scene states. If properties of one or more objects have changed, the delta between the object's states is determined and used by a fragment-encoding module in the case in which the corresponding fragment has not already been generated and stored in a fragment-caching module. The information is used to define, for example, the motion vectors used by the fragment-encoding module in the construction of the fragments for the stitching module, which assembles the fragments, from which to build the composited video frame sequence.

In some embodiments, the information about the changes in the scene's state is also used to decide whether a macroblock is to be encoded spatially, using an intra-encoded macroblock, or temporally, using an inter-encoded macroblock, and, given a certain encoding, what the optimal partitioning of the macroblock is. In some embodiments, the information about the changes in the scene's state may also assist in finding the optimal weight and offset of the temporal reference to minimize the residual. The benefits of using scene state information in the encoding process include a gain in efficiency with respect to the resources used to encode the fragments, as well as improvements in the visual quality of the encoded fragments or to minimize the size of the encoded fragments because spatial relations in the current scene state or temporal relations between the previous scene state and current scene state can be more accurately determined.

Objects may be maintained in a two-dimensional coordinate system. Alternatively, two-dimensional (flat) objects may be maintained in a three-dimensional coordinate system, or a full three-dimensional object model may be maintained in a three-dimensional coordinate system. The objects may be kept in a hierarchical structure, such as a scene graph. Additional three-dimensional object or scene properties known to the trade may be used (e.g., perspective, lighting effects, reflection, refraction, fog, etc.).

The scene states (previous and current) may result from the output of an application engine such as an application execution engine. This cloud-based application execution engine may be a web browser, a script interpreter, operating system, or other computer-based environment that is accessed during operation of the application. The application execution engine may interface with the described system using a standardized API (application programming interface), such as, for example, OpenGL. The system may translate the scene representation as expressed through the API to a convenient internal representation or directly derive state changes from the API's primitives.

The above-described method may be embodied as a computer program product where the computer program product includes a non-transitory computer readable medium having computer code thereon for performing the method and thus for creating an encoded video sequence. The method may be performed by a system that includes one or more processors that perform specified functions in the creation of the encoded video sequence. For example, the system includes the one or more processors and also includes memory storing instructions that, when executed by the one or more processors, cause the system to perform the method.

In some embodiments, a process translates certain scene-graph changes to pixel representations that are encoded in data structures. The data structures may be encoded in HTML wrappers and transmitted to a client application on a client device to be decoded and rendered by the client for display. The data structures can be any graphical representation that can be encoded using any common HTML command to convey the representation to a standard HTML-based client application such as a web browser. In this context, and by way of example, a common HTML command means a simplified HTML language command set which utilizes only the basic functions of HTML4 common to HTML interpreters found in the majority of (e.g., most) consumer electronics devices that employ HTML interpreters.

Information layers prepared by the server for transmission toward and subsequent use by a client application can be any information representation that is decodable by the client application. For example, the client application could be any standard web browser such as Microsoft's Internet Explorer, Google's Chrome, and Mozilla's Firefox, among others. The client application could also be a custom-written software application that utilizes an HTML interpreter as an imbedded element.

BRIEF DESCRIPTION OF THE DRAWINGS

The foregoing features of embodiments will be more readily understood by reference to the following detailed description, taken with reference to the accompanying drawings, in which.

DETAILED DESCRIPTION

Figure 1:
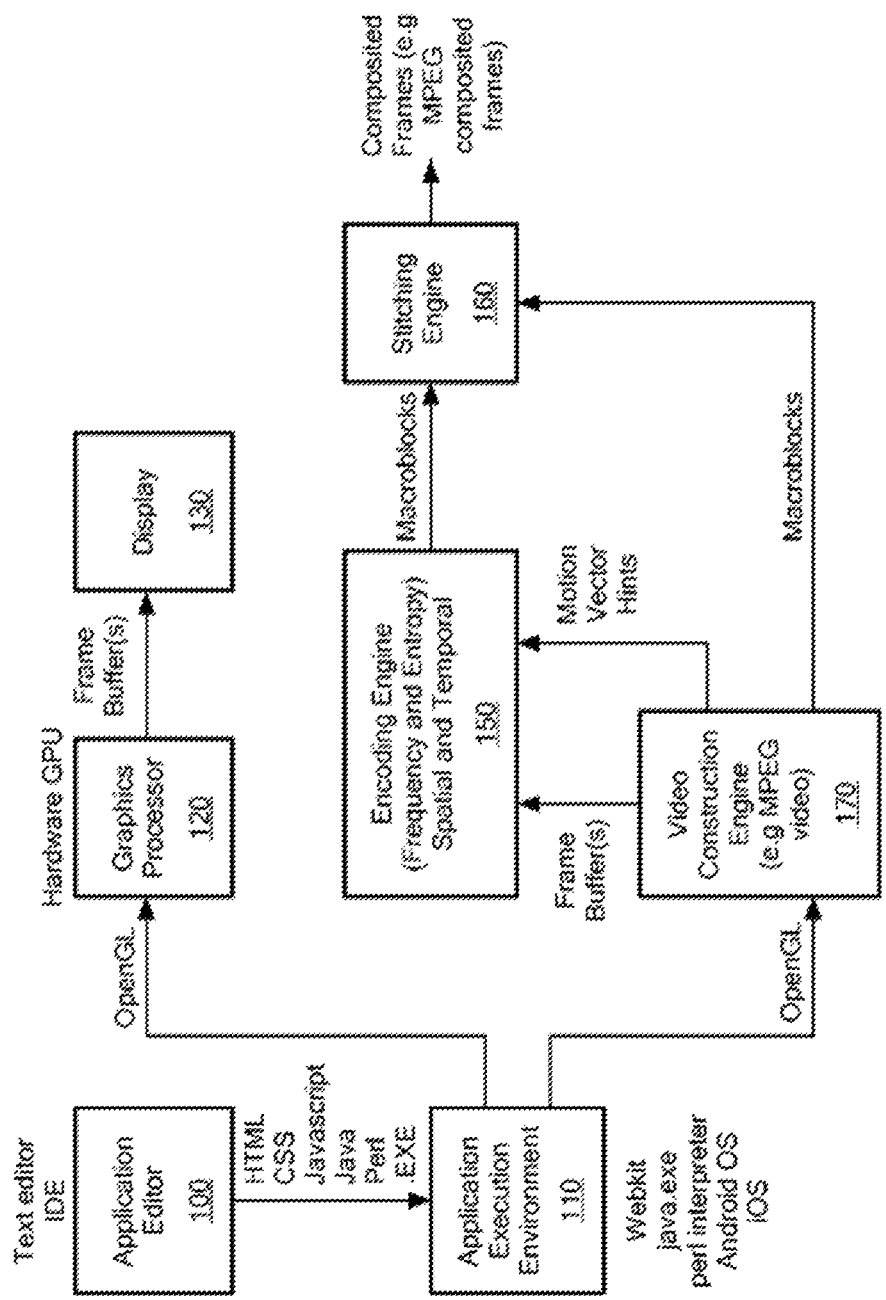
FIG. 1 shows components that are used in processing application environment data and constructing an encoded video sequence from the data, in accordance with some embodiments.

As used in this description and the accompanying claims, the following terms shall have the meanings indicated, unless the context otherwise requires:

The term "application" refers to an executable program, or a listing of instructions for execution, that defines a graphical user interface ("GUI") for display on a display device. An application may be written in a declarative language such as HTML or CSS, a procedural language such as C, JavaScript, or Perl, any other computer programming language, or a combination of languages.

"Application execution environment" is an environment that receives in an application all its components and manages the execution of the components to define a graphical layout which includes the various interactions with the graphical layout. For example, Trident, WebKit, and Gecko are software layout modules that convert web pages into a collection of graphical objects (text strings, images, and so on) arranged, per various instructions, within a page display area of a web browser. The instructions may be static, as in the case of parts of HTML, or dynamic, as in the case of JavaScript or other scripting languages, and the instructions may change as a function of user input. Trident is developed by Microsoft Corporation and used by the Internet Explorer web browser; WebKit is developed by a consortium including Apple, Nokia, Google and others, and is used by the Google Chrome and Apple Safari web browsers; Gecko is developed by the Mozilla Foundation, and is used by the Firefox web browser. Operating systems such as Google's Android and Apple's iOS may be considered application execution environments because these operating systems can execute applications. The output of an application execution environment is a screen state (either absolute or relative to a previous screen state). The screen state may be presented as a scene state.

"Video Construction Module" compares scene states and derives which areas on the display device are to be changed. The video construction module determines how to map the changed areas to encoded fragments that can be stitched together and maintains a cache of already encoded fragments. If fragments are not available in an encoded form, the video construction module interacts with a fragment encoding module to encode the fragment.

"Fragment Caching Module" stores fragments in volatile memory (e.g., the system's RAM) or persistent memory (e.g., a disc-based file system).

"Fragment Encoding Module" transforms graphical data and associated information about spatial and/or temporal relations into one or more encoded fragments.

"Stitching Module" receives as input one or more fragments (e.g., MPEG encoded elements) along with layout information and then constructs complete video frames for a video sequence (e.g., MPEG video frames for an MPEG elementary stream).

"Scene" is a model of an image generated by an application execution engine consisting of objects and their properties;

"Scene state" is the combined state of all objects and their properties at a moment in time.

"DOM" (document object model) is a convention for representing and interacting with objects in markup languages such as HTML and XML documents.

"DOM tree" is a representation of a DOM (document object model) for a document (e.g., an HTML file) having nodes wherein the topmost node is the document object.

"CSS" (cascading style sheets) provide the graphical layout information for a document (e.g., an HTML document) and how each object or class of objects should be represented graphically. The combination of a DOM object and the corresponding CSS files (i.e. layout) is referred to as a rendering object.

"Render layer" is a graphical representation of one or more objects of a scene graph state. For example, a group of objects that have a geographical relationship such as an absolute or a relative position to each other may form a render layer. An object may be a separate render layer if, for example, the object is transparent, has an alpha mask, or has a reflection. A render layer may be defined by a screen area, such as a screen area that can be scrolled. A render layer may be designated for an area that may have an overlay (e.g., a pop up). A render layer may be defined for a portion of a screen area if that area is to have an applied graphical filter (e.g., a blur, color manipulation, or shadowing). A layer may be defined by a screen area that has associated video content. Thus, a render layer may be a layer within a scene graph state or a modification of a scene graph state layer in which objects are grouped according to a common characteristic.

"Fragment" is one or more MPEG-encoded macroblocks, as disclosed in U.S. patent application Ser. No. 12/443,571, filed Oct. 1, 2007, the contents of which are incorporated by reference in their entirety. A fragment may be intra-encoded (spatially-encoded), inter-encoded (temporally-encoded), or a combination thereof.

FIG. 1 shows components that are used in processing application environment data and constructing an encoded video sequence from the data in accordance with some embodiments. The application environment data provides information about visual content to be rendered on a display device of a client. The data from an application execution environment 110 may be processed through one of a plurality of possible paths. In the first path, data from the application execution environment 110, which may be OpenGL library function calls, is passed to a hardware-based graphics accelerator 120 (i.e., a graphics processor/graphics processing unit) and presented on a display 130. In an alternative path, the data from the application execution environment 110 is passed to a video construction engine 170. The video construction engine 170 exploits information within the data from the application execution environment 110 to improve the encoding process and reduce the number of calculations to be performed.

FIG. 1 is now explained in more detail. An application is constructed in an application editor 100. The application editor 100 may be an integrated development environment (IDE) or a text editor, for example. The output of the application editor may include one or more sections. The application may be composed of one or more of the following: HTML (hypertext markup language) data, CSS (cascading style sheets) data, script(s) from various scripting languages such as JavaScript and Perl, program code (e.g., JAVA) for execution in an application execution environment, and/or executable programs (*.exe). The components of the application may then be executed in an application execution environment 110 in response to a request for the application by a client device operating remotely from the application execution environment. An application execution environment 110 receives the application including its various components and creates an output file that can be used for display on a display device of the client. For example, the application execution environment may create a program referencing a number of OpenGL library functions/objects. OpenGL is a specification that describes an abstract API for drawing 2D and 3D graphics and is known to one of ordinary skill in the art.

As shown, the application execution environment 110 may produce an output for graphical processing. Examples of application execution environments 110 include both computer software and hardware and combinations thereof for executing the application. Applications can be written for certain application execution environments including WebKit, JAVA compilers, script interpreters (e.g., Perl etc.) and various operating systems including, for example, iOS and Android OS.

The video construction engine 170 takes advantage of the data that it receives from the application execution environment 110 to exploit redundancies in requests for the presentation of information within user sessions and between user sessions as well as determining motion changes of objects from a previous video frame or scene graph state to a current frame or scene graph state. The system of FIG. 1 may be used in a networked environment wherein multiple user sessions are operational simultaneously wherein requested applications may be used by multiple users simultaneously.

The video construction engine 170 may receive OpenGL data and can construct a scene graph from the OpenGL data. The video construction engine 170 compares the current scene graph state to one or more previous scene graph states to determine if motion occurs between objects within the scene. If motion occurs between the objects, this motion can be translated into a motion vector and this motion vector information can be passed to an encoding module 150. Thus, the encoding module 150 need not perform a motion vector search and can add the motion vectors into the video frame format (e.g., MPEG video frame format). MPEG elements can be constructed that are encoded MPEG macroblocks that are inter-frame encoded. These macroblocks are passed to the stitching module 160, which receives stitching information about the video frame layout and stitches together encoded MPEG elements to form complete MPEG encoded video frames in accordance with the scene graph. Either simultaneously or in sequence, the video construction engine 170 may hash the parameters for objects within the scene graph according to a known algorithm. The video construction engine 170 compares the hash value to hash values of objects from previous scene graphs and if there is a match within the table of hashes, the construction engine 170 locates MPEG-encoded macroblocks (i.e., MPEG elements) that are stored in memory and are related to the hash. These MPEG elements can be passed directly to the stitching engine 160, which stitches the MPEG elements together to form complete MPEG-encoded video frames. Thus, the output of the stitching module 160 is a sequence of encoded video frames that contain both intra-frame encoded macroblocks and inter-frame encoded macroblocks. Additionally, the video construction engine 170 outputs pixel-based information to the encoding engine 150. This pixel-based information may be encoded using spatial based encoding algorithms including the standard MPEG DCT processes. This pixel-based information results from changes in the scene (visual display) in which objects represented by rectangles are altered. The encoded macroblocks can then be passed to the stitching engine 160.

Figure 2:
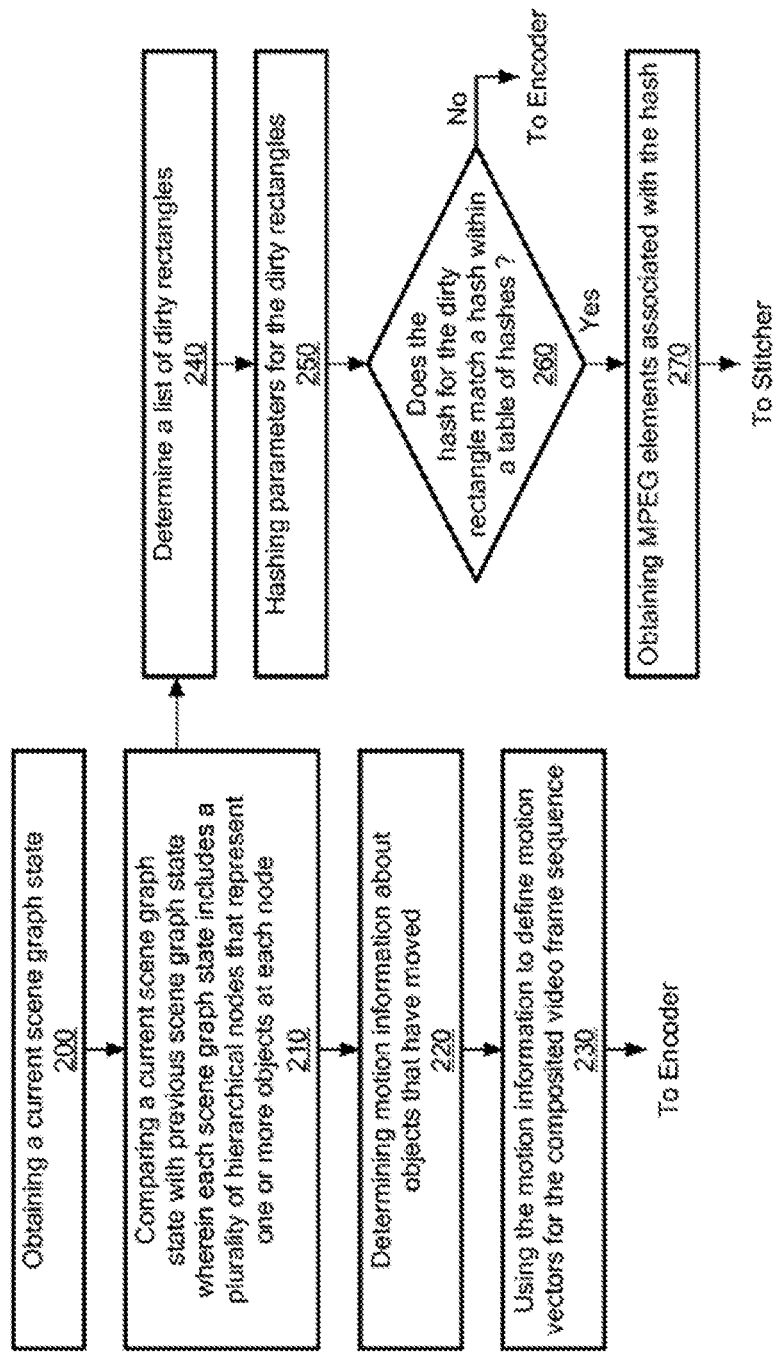
FIG. 2 shows a flow chart for implementing the functionality of relevant components in accordance with some embodiments.

FIG. 2 shows a flow chart for implementing the functionality of relevant components in accordance with some embodiments. A user of the system at a client device interacts with the application through an application execution engine (e.g., the application execution environment 110). The user makes a request for content through a key press or other input that generates a control signal that is transmitted from the client device to the application execution engine that indicates that there should be a screen update of one or more screen elements (e.g., rectangles). Thus, the rectangles to be updated can be defined as a dirty rectangle that will need either to be retrieved from memory if the dirty rectangle has previously been rendered and encoded, or provided to an encoder (e.g., encoding engine 150) if the dirty rectangle has not previously been rendered and encoded. The encoder may receive motion vector information, which will avoid motion vector calculations. The encoder may receive spatial data for dirty rectangles, which need to be spatially encoded.

The application execution engine may be proximate to the client device, operational on the client device, or may be remote from the client device, such as in a networked client/server environment. The control signal for the dirty rectangle causes the application execution engine to generate a scene graph having a scene graph state that reflects the changes to the screen (e.g., dirty rectangles of the screen display). For example, the application execution environment 110 may include a web browser operating within an operating system. The web browser represents a page of content in a structured hierarchical format such as a DOM and corresponding DOM tree. Associated with the DOM tree is a CSS that specifies where and how each object is to be graphically rendered on a display device. The web browser creates an output that can be used by a graphics engine. The output that is produced is the scene graph state, which may have one or more nodes and objects associated with the nodes forming a layer (i.e. a render layer). As requests occur from a client device for updates or updates are automatically generated (e.g., in a script), a new or current scene graph state is generated. Thus, the current scene graph state represents a change in the anticipated output video that will be rendered on a display device.

Once the current scene graph state is obtained 200 by the video construction engine 170, the scene graph state can be compared 210 with a previous scene graph state. The comparison of scene graph states can be performed hierarchically by layer and by object. For each object associated with a node, differences in the positions of objects from the scene graph states can be identified as well as differences in characteristics, such as translucence and lighting.

For example, in a simple embodiment, a circle may be translated by a definable distance between the current scene graph state and a previous scene graph state. The system queries whether one or more objects within the scene graph state have moved. If one or more objects have been identified as moving between scene graph states, information about the motion translation is determined 220. This information may require the transformation of position data from a three-dimensional world coordinate view to a two-dimensional screen view so that pixel-level motion (two-dimensional motion vectors) can be determined. This motion information can then be passed on to an encoder (e.g., encoding engine 150) in the form of a motion vector 230. Thus, the motion vector information can be used by the encoder to create inter-frame encoded video frames. For example, the video frames may be P- or B-frame MPEG-encoded frames.

In addition to objects moving, scene elements may also change. Thus, a two-dimensional representation of information to be displayed on a screen can be ascertained from the three-dimensional scene graph state data. Rectangles can be defined 240 as dirty rectangles, which identify data on the screen that has changed. These rectangles can by hashed 250 according to a known formula that will take into account properties of the rectangles. The hash value can then be compared 260 to a listing of hash values associated with rectangles that were updated from previous scene graph states. The list of hash values may be for the current user session or for other user sessions. Thus, if a request for a change in the content being displayed in an application is received from multiple parties, the redundancy in information being requested can be exploited and processing resources conserved. For example, if the hash matches a hash within the searchable memory (260—Yes), encoded graphical data (e.g., either a portion of an entire video frame of encoded data or an entire frame of encoded data) that is linked to the hash value in the searchable memory is retrieved 270 and the data can be combined with other encoded video frames.

Additionally, if a rectangle is identified as being dirty and a hash is not identified (260-No), the spatial information for that rectangle can be passed to the encoder, which will spatially encode the data for the rectangle. As used herein, the term content may refer to a dirty rectangle or an object from a scene graph state.

Figure 3:
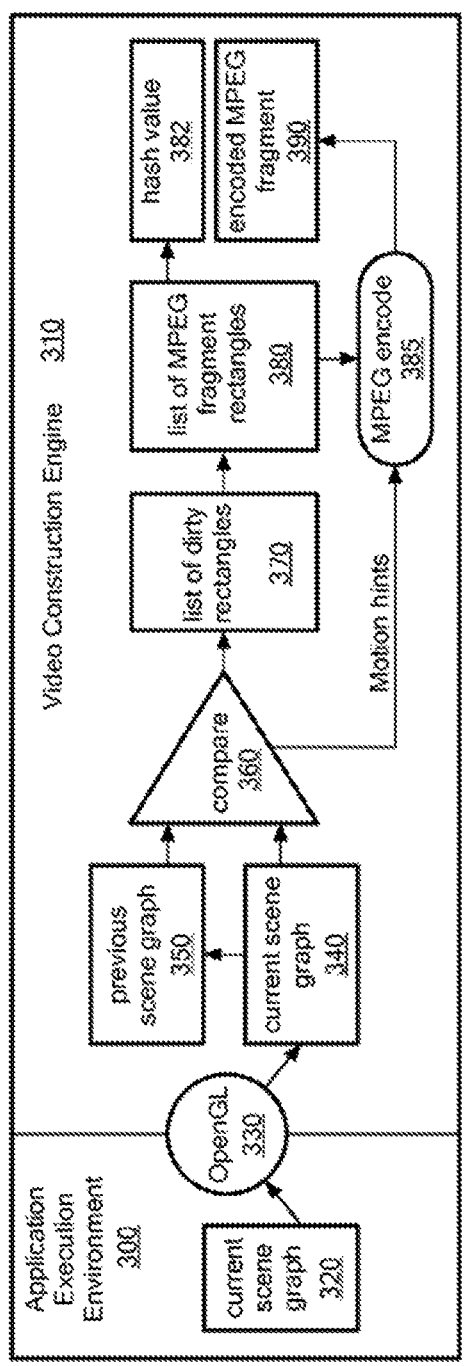
FIG. 3 shows data flow between an application execution environment and video construction engine and data flow internal to the video construction engine in accordance with some embodiments.

FIG. 3 shows data flow between an application execution environment 300 (e.g., application execution environment 110) and video construction engine 310 (e.g., video construction engine 170) and the data flow internal to the video construction engine 310 in accordance with some embodiments. As previously indicated, an application execution environment 300 receives as input an application and the application execution environment 300 executes the application and receives as input user requests for changes to the graphical content that is displayed on a display device associated with the user.

The application execution environment 300 creates a current scene graph 320. The current scene graph may be translated using a library of functions, such as the OpenGL library 330. The resulting OpenGL scene graph state 340 is passed to the video construction engine 310. The OpenGL scene graph state 340 for the current scene graph is compared to a previous scene graph state 350 in a comparison module 360. This may require the calculation and analysis of two-dimensional projections of three-dimension information that are present within the scene graph state. Such transformations are known by one of ordinary skill in the art. It should be recognized that OpenGL is used herein for convenience and that a scene graph state may be created in other ways. Thus, the scene graph state need not be converted into OpenGL before a scene graph state comparison is performed.

Differences between the scene graphs are noted and dirty rectangles can be identified 370. A dirty rectangle 370 represents a change to an identifiable portion of the display (e.g., a button changing from an on-state to an off-state). There may be more than one dirty rectangle that is identified in the comparison of the scene graph states. Multiple objects within a scene may change simultaneously, causing the identification of more than one dirty rectangle.

From the list of dirty rectangles 370, a list of MPEG fragment rectangles 380 (i.e. spatially defined fragments, such as a plurality of macroblocks on macroblock boundaries) can be determined for the dirty rectangle (or for each dirty rectangle). The term MPEG fragment rectangle as used in the present context refers to spatial data and not frequency-transformed data and is referred to as an MPEG fragment rectangle because MPEG uses a block-based formatting schema (i.e. macroblocks that are generally 16×16 pixels in shape). Defining dirty rectangles as MPEG fragment rectangles can be achieved by defining an MPEG fragment rectangle for a dirty rectangle wherein the dirty rectangle is fully encompassed within a selection of macroblocks. Thus, the dirty rectangle fits within a rectangle composed of spatially defined macroblocks. In some embodiments, the dirty rectangles are combined or split to limit the number of MPEG fragment rectangles that are present or to avoid small changes in large rectangles.

For each MPEG fragment rectangle, a listing of nodes according to z-order (depth) in the scene graph that contributed to the rectangle contents is determined. This can be achieved by omitting nodes that are invisible, have a low opacity, or have a transparent texture.

For each MPEG fragment rectangle, a hash value 382 is created based upon relevant properties of all nodes that have contributed to the rectangle contents (e.g., absolute position, width, height, transformation matrix, hash of texture bitmap, opacity). If the cache contains an encoded MPEG fragment associated with that hash value, then the encoded MPEG fragment is retrieved from the cache. In the present context, the term encoded MPEG fragment refers to a portion of a full frame of video that has been encoded according to an MPEG standard. The encoding may be DCT encoding for blocks of data or may also include MPEG-specific header information for the encoded material. If the calculated hash value does not match an MPEG fragment in the cache, then the dirty rectangle contents (using the scene graph state) are rendered from a three-dimensional world view to a two-dimensional screen view and the rendered pixel data (i.e. spatial data) are encoded in an encoder, such as an MPEG encoder 385. The encoded MPEG data (e.g., encoded MPEG fragment(s) 390) for the scene are stored into the cache.

As part of the encoding process, the fragment is analyzed to determine whether the encoding can best be performed as 'inter' encoding (an encoding relative to the previous screen state) or as 'intra' encoding (an independent encoding). Inter-encoding is preferred in general because it results in less bandwidth and may result in higher quality streams. All changes in nodes between scene graphs are determined including movement, changes of opacity, and changes in texture for example. The system then evaluates whether these changes contribute to a fragment, and whether it is possible to express these changes efficiently in the video codec's primitives. If the evaluation indicates that changes to dominant nodes can be expressed well in the video codec's primitives, then the fragment is inter-encoded. These steps are repeated for every screen update. Since the 'new scene graph' will become the 'previous scene graph' in the next screen update, intermediate results can be reused from previous frames.

Figure 11:
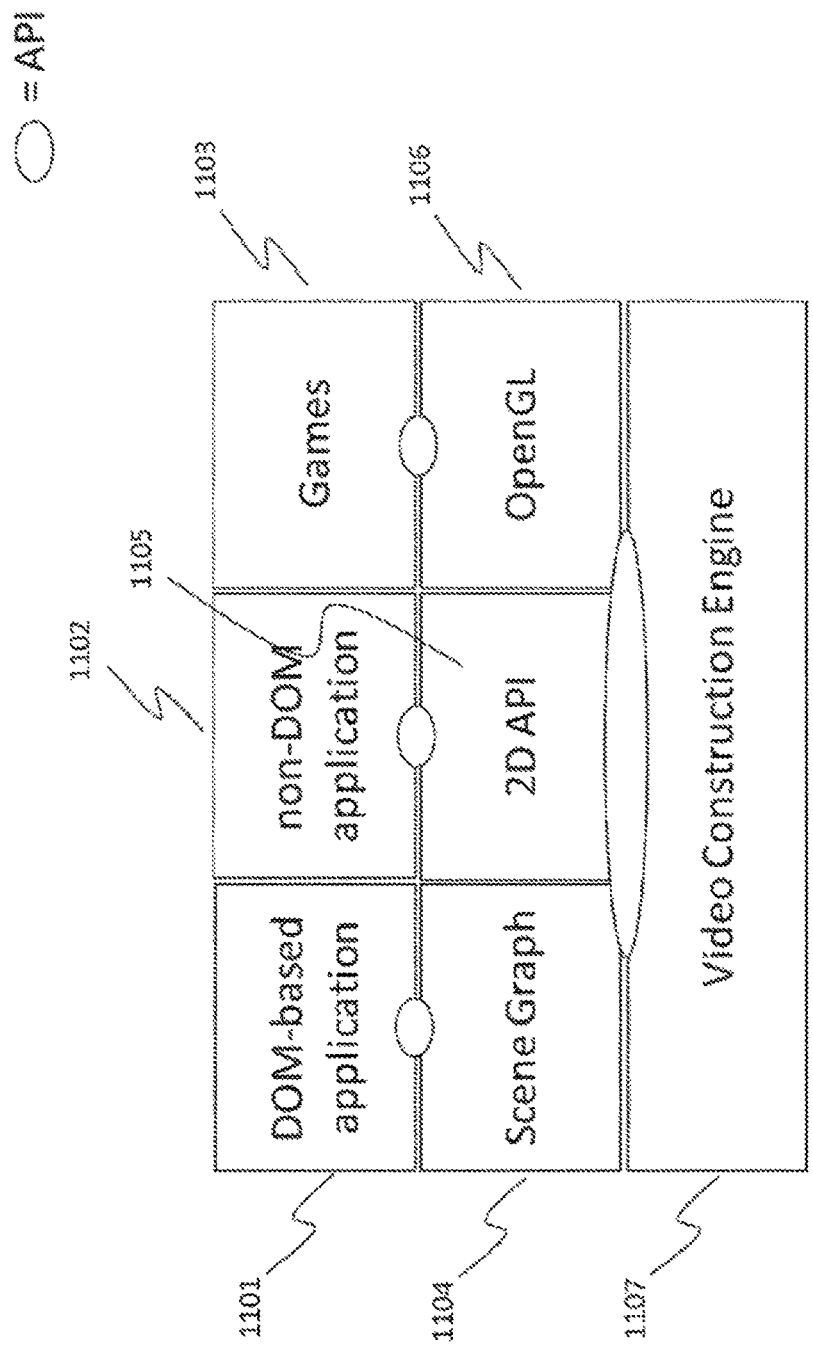
FIG. 11 shows examples of application execution engines using proprietary or standardized APIs to interact with a video construction engine, in accordance with some embodiments.

FIG. 11 shows three examples of application execution engines using proprietary or standardized APIs to interact with the video construction engine, in accordance with some embodiments. The first example is a DOM-based application execution engine 1101 (e.g., the Webkit application execution engine). A DOM-based application execution engine may use a scene graph module 1104 to map render layers to the video construction engine 1107 (e.g., video construction engine 170/310). The second example is a non-DOM-based application execution engine 1102 that may use a 2D API to interface to a 2D API module 1105 to interact with the video construction engine 1107. In the third example, games 1103 may interact through an OpenGL API with an OpenGL module 1106 that translates OpenGL primitives to calls into the video construction engine 1107. In each of these examples, the API providers may interface with the video construction engine 1107 through a common API.

Figure 12:
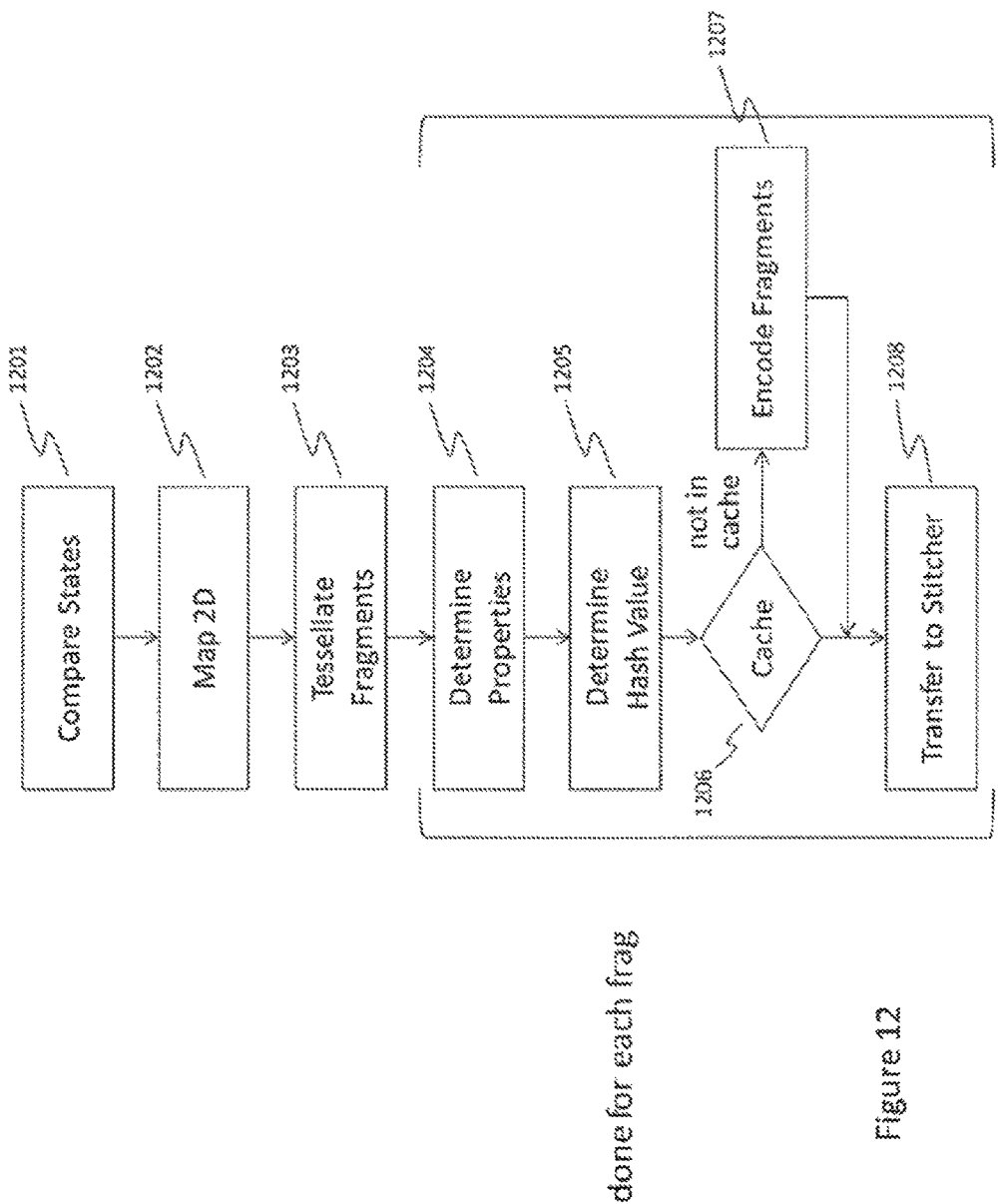
FIG. 12 shows a flow chart for implementing the functionality of a video construction engine in accordance with some embodiments.

FIG. 12 shows a flow chart for implementing the functionality of a video construction engine (e.g., video construction engine 170/310/1107) in accordance with some embodiments. Input to the comparison step 1201 is a current scene state and a previous scene state. The comparison yields a list of objects that have changed and the delta of the changed properties (e.g., the object's position, transformation matrix, texture, translucency, etc.), or any objects that have been added or removed from the current scene.

Since objects may be maintained in a two-dimensional coordinate system, as two-dimensional (flat) objects in a three-dimensional coordinate system, or as full three-dimensional object models in a three-dimensional coordinate system, a mapping is made for each object from the scene's coordinate system to the current and previous field of view. The field of view is the extent of the observable scene at a given moment. For each object on the list of changed, added, or removed objects, it is determined in step 1202 whether the object's change, addition or removal was visible in the field of view of the scene's current state or the field of view of the previous state and what bounding rectangle represented that change in states.

Bounding rectangles pertaining to the objects' previous and current states may overlap in various constellations.

Fragments, however, do not overlap. Before fragments are identified, overlapping conditions are resolved. This is done in step 1203 by applying a tessellation (i.e., tiling) process as depicted in FIG. 13.

Figure 14:
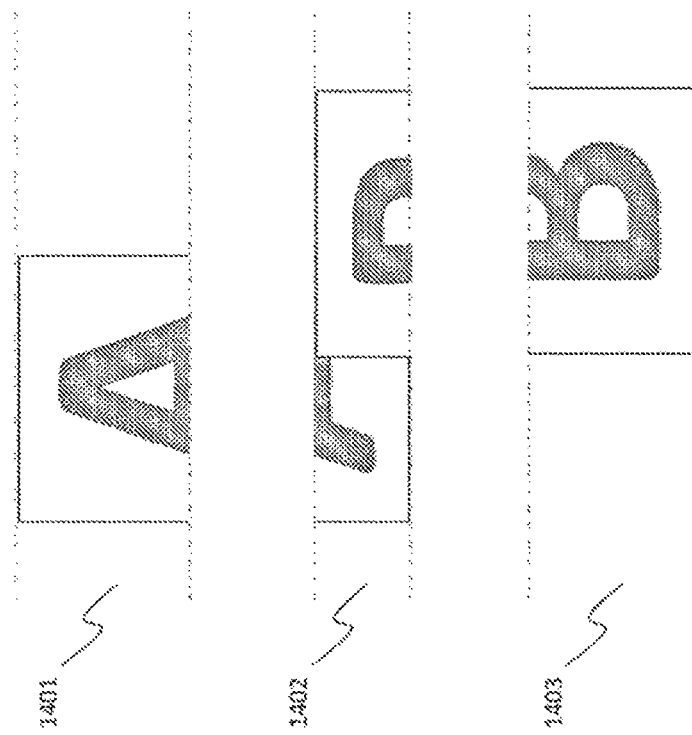
FIGS. 13 and 14 demonstrate a tessellation process in accordance with some embodiments.
Figure 13:
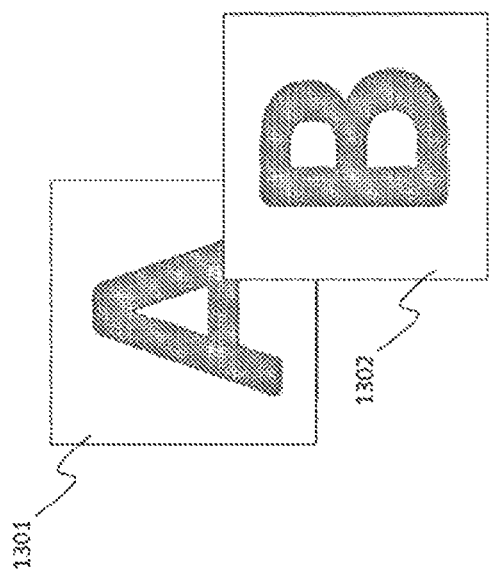

Suppose that overlapping rectangles 1301 for object A and 1302 for object B as depicted by FIG. 13 are processed by the tessellation process. Both rectangles are first expanded to only include complete macroblocks, so that fragments may be derived from the resulting tessellations. The tessellation process then applies an algorithm that yields non-overlapping rectangles that, combined, are the equivalent of the union of the original rectangles. A possible outcome of the tessellation process for the constellation as depicted in FIG. 13 is depicted in FIG. 14. In this example, the process yields three rectangles 1401, 1402, and 1403. These rectangles are non-overlapping and macroblock-aligned. Combined they are equivalent to the overlapping rectangles of FIG. 13. This is just one example of many equivalent tessellation results; the preferred tessellation may depend on policies. One policy, for example, is that rectangles representing the current state should have preference over rectangles that represent the previous state.

Returning to step 1203, the tessellation process is first applied to the rectangles pertaining to the objects' previous states. When an object changes position or its transformation matrix changes, graphical data may be revealed that was obscured in the previous state. The object's new bounding rectangle typically only partially overlaps with the object's previous bounding rectangle. A fragment is made that encodes this exposure. Therefore, step 1203 first applies the tessellation process to all bounding rectangles of the objects' previous states. Subsequently, the bounding rectangles of the objects' current states are added to the tessellation process. The resulting rectangles represent the fragments that constitute the update from the previous scene state to the current scene state. Steps 1204 to 1208 are performed for each fragment.

Step 1204 determines the "fragment tessellation" process. The resulting rectangles represent the fragments that constitute the update, which objects contribute to the fragment's pixel representation, and which contributing object is the dominant object. If an object dominates the fragment's pixel representation, the object's rectangle pertaining to the previous state is used as a reference window for temporal reference and the fragment may be inter-encoded. If multiple objects dominate the fragment's representation, a union of multiple previous state rectangles may be used as a reference window. Alternatively, the fragment's current bounding rectangle may be used as a reference window.

The fragment objects contribute to the fragment's pixel representation and to which contributing object is the dominant object. If an object dominates the fragment's pixel representation, the object's rectangle pertaining to the previous state objects and encoding attributes (e.g., such as profile, level or other codec specific settings, differences in quantization, use of the loop filter, etc.) may be used to distinguish encoder-specific variants of otherwise equivalent fragments. If the fragment has a reference window, the hash is extended with the coordinates of the reference window in pixel units, the properties of the objects contributing to the reference window, and the transformation matrix of the dominant object. Hence, the hash as determined in step 1205 uniquely describes the fragment that encodes the scene's current state for the fragment's rectangle and, if a temporal relation can be established, a transition from the scene's previous state to the current.

In step 1206 the hash uniquely identifying the fragment is checked against a hash table. If the hash cannot be found in the hash table, the fragment description is forwarded to the fragment encoding module and encoded in step 1207. If the hash is found in the hash table, the associated encoded fragment is retrieved from the fragment caching module and transferred to the stitching module (i.e., stitcher) in step 1208.

In step 1207, fragments are encoded from pixel data pertaining to the current scene state and, if available, pixel data pertaining to the previous scene state and metadata obtained from the scene's state change (e.g., the type of fragment, transformation matrices of the objects contributing to the fragment, changes in translucency of the objects) into a stitchable fragment. Many efficiency and quality improvements may be achieved in step 1207. Many steps in the encoding process, such as the intra/inter decision, selection of partitions, motion estimation, and weighted prediction parameters benefit from the metadata because it allows for derivation of the spatial or temporal relations relevant for the encoding process. Once a fragment has been encoded, the fragment is stored in the fragment caching module and transferred to the stitching module in step 1208.

Step 1208 forwards stitchable fragments to the stitching module. Objects are generally handled as atomic entities, except for the background object. The background object is a fixed object at infinite distance that spans the entire field of view. A consequence of treating the background as an atomic entity would mean that small changes to the background would potentially permeate in the hash values of all fragments in which the background is visible. Therefore, in some embodiments the background texture is treated as described in U.S. Pat. No. 9,123,084, which is incorporated by reference in its entirety. Changes to the background thus only have consequences for fragments overlapping the dirty rectangles of the background.

Figure 4:
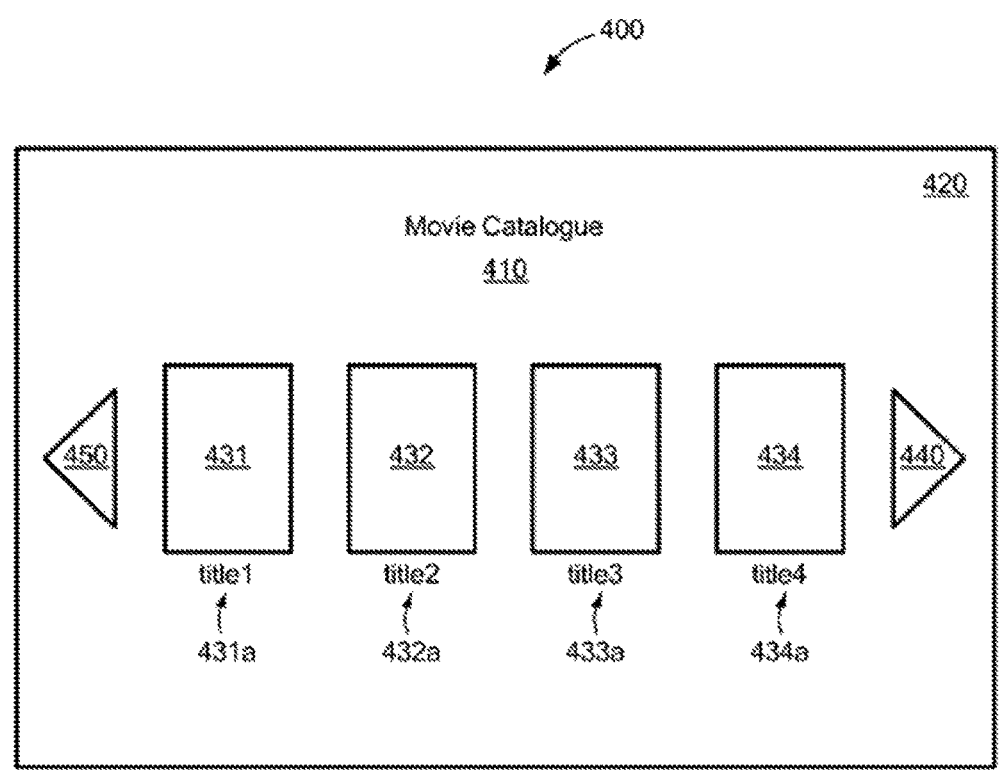
FIG. 4 shows a screen shot of an application in accordance with some embodiments.

The following examples relate to embodiments using a DOM-based application execution engine 1101, scene graph module 1104, and video construction engine 1107 (FIG. 11). FIG. 4 shows an exemplary screen shot 400 of an application that may be rendered on a display device per the previously described methodology. The display shows a video frame of the application that has the title "Movie Catalogue" 410. The video frame also includes a static background 420 and shows a plurality of selectable movie frames 431, 432, 433, 434. Each movie frame is selectable and associated with a separate underlying movie. The movie frames may include one or more full-motion elements (e.g., may display a clip from the movie or a transition of multiple images, or may be movable in a scripted fashion). The screen shot 400 includes the titles (431a, 432a, 433a, 434a) for each of the displayed movies. In the present example, there are four movie frames and associated titles displayed on the current screen. Additionally, the video frame includes a right-pointing arrow 440 and a left-pointing arrow 450 that, when selected, provide the user with additional movies that may be selected. The screen shot 400 may be displayed using an application such as a web-browser or another graphical display application such as an application execution environment. The application may reside remote from the client device wherein video content, such as a sequence of MPEG video frames (e.g., an MPEG elementary stream) is sent from a server to the client device. The video content represents the output display of the application. The server may include the environment for executing the application. The graphical output is transformed to an MPEG elementary stream in accordance with disclosed embodiments.

Figure 5:
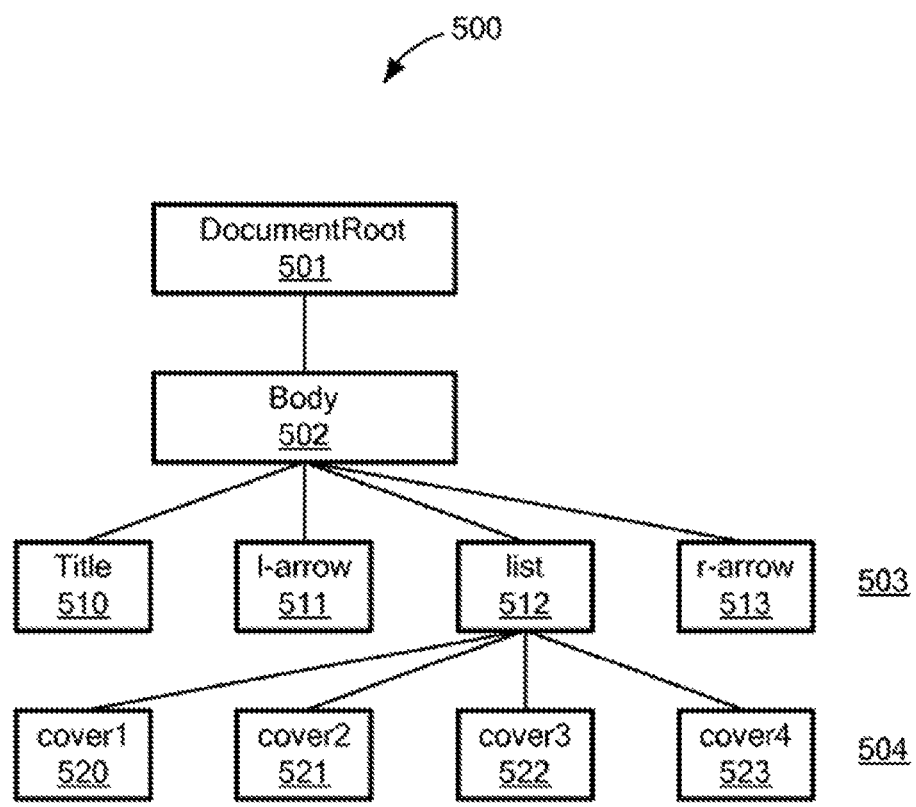
FIG. 5 shows a representative DOM tree for the application of FIG. 4 in accordance with some embodiments.

FIG. 5 shows a representative DOM tree 500 for the application of FIG. 4. The DOM tree is a document object model representation of the hierarchical objects in a tree structure with associated nodes. A document object model is a cross-platform and language-independent convention for representing and interacting with objects in HTML, XHTML and XML documents. The document object model does not include position information, fonts, or effects. This information would be included in an associated CSS document (cascading style sheet document). As shown, there are four levels (501-504) to the DOM tree and the nodes entitled "Body" 502 and "list" 512 each include multiple sub-nodes. Thus, the Body node 502 includes the Title 510, left-arrow 511, list 512, right-arrow 513 as objects/sub-nodes, and the list 512 includes cover1 520, cover2 521, cover3 522, and cover4 523 (corresponding to frames 431, 432, 433, 434) as objects/sub-nodes. The construction of DOM trees is well known in the art and typically used by applications such as web browsers.

Figure 6:
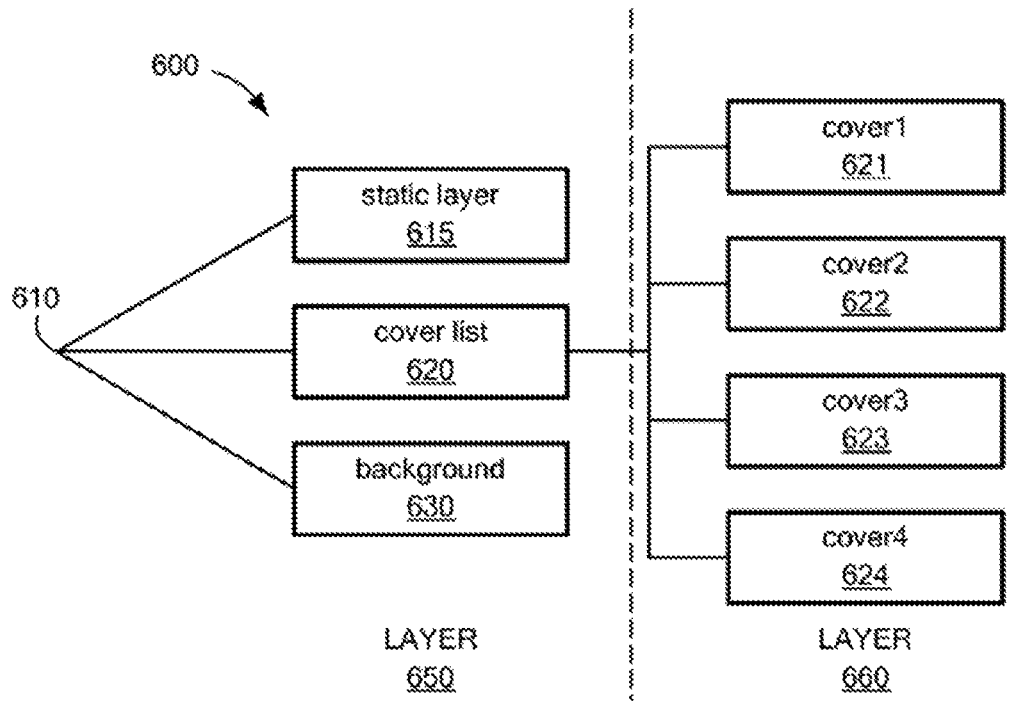
FIG. 6 shows an exemplary scene graph model of the image of FIG. 4 in accordance with some embodiments.

FIG. 6 shows an exemplary scene graph model of the application screen shot of FIG. 4 that can be built based upon the DOM tree of FIG. 5, in accordance with some embodiments. A scene graph is a data structure used for representing both logical and spatial objects for a graphical scene. The complete "scene graph state" also includes the textures, spatial information that describes how the texture is positioned into a 2D or 3D space (e.g., a transformation matrix), and other attributes for rendering the screen. In exemplary embodiments using the OpenGL API to interface to WebKit, the spatial information for the present example is a 4×4 matrix that specifies translation (i.e. position of the texture in space), rotation, slanting, shearing, shrinking, etc. For simplicity, the following examples use only 2D coordinates, but this could be extended to a 3D transformation matrix. Programs that employ scene graphs include graphics applications (e.g., WebKit, Adobe Acrobat, AutoCAD, CorelDraw, VRML97, etc.), graphics acceleration programs and corresponding graphics acceleration hardware, and 3D applications and games.

The tree-like structure provides a hierarchical representation wherein attributes of parent objects can be attributed to the child objects. The root object represents the entire scene 610, while child nodes of a certain node may contain a decomposition of the parent node into smaller objects. The nodes may contain a texture (bitmap object), a 3D transformation matrix that specifies how the texture is positioned in a 3D space, and graphical attributes such as visibility and transparency. A child node inherits all attributes, transformations, and filters from the parent node.

For example, movement between scene graphs for an object such as the "cover list" 620 would indicate that each of the child objects (cover1, cover2, cover3, and cover4) 621, 622, 623, 624 would also move by an equal amount. As shown, the screen shot of FIG. 4 includes a hierarchy with a static layer 615, a cover list layer 620, and a background layer 630, and cover1, cover2, cover3, and cover4 are at a sub-layer for the cover list layer. The choice of objects that are associated with a specific layer is performed by the application execution environment, such as in a web browser.

Figure 7:
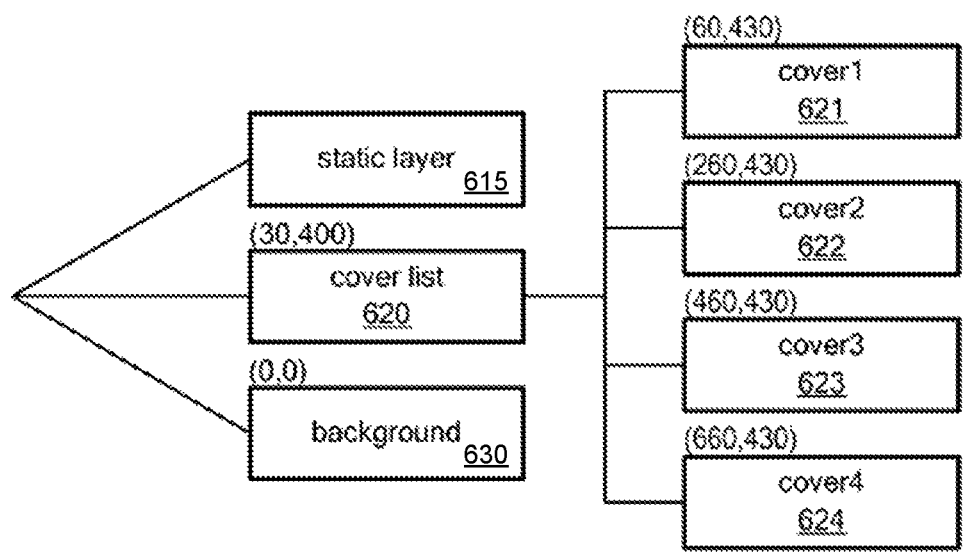
FIG. 7 shows a scene graph state with associated screen position information in accordance with some embodiments.

FIG. 7 shows a scene graph state with associated screen position information. As shown, the upper left position of each object is provided (i.e. world coordinates). For example, the cover list layer 620 begins at (30, 400), which is 30 pixels right in the X direction (assuming standard video X, Y coordinates) and 400 pixels down in the Y direction. This scene graph state allows a web browser or other application that produces a scene graph state to instruct a graphical processing unit or other program (e.g., a video construction engine 170/310/1107), such as that shown and discussed with respect to FIGS. 11 and 12, to render the movie covers 621, 622, 623, 624 including certain effects (e.g., shadows, reflections) and to be able to manipulate the position of these objects. The web browser or other application execution environment would then pass the scene graph state and request rendering of the screen. The standardized OpenGL API may be used for this communication (e.g., to interface to different GPUs). The OpenGL API is not only used by web browsers, but by many applications in general, across many operating systems (e.g., Linux, Windows, Android).

Figure 8:
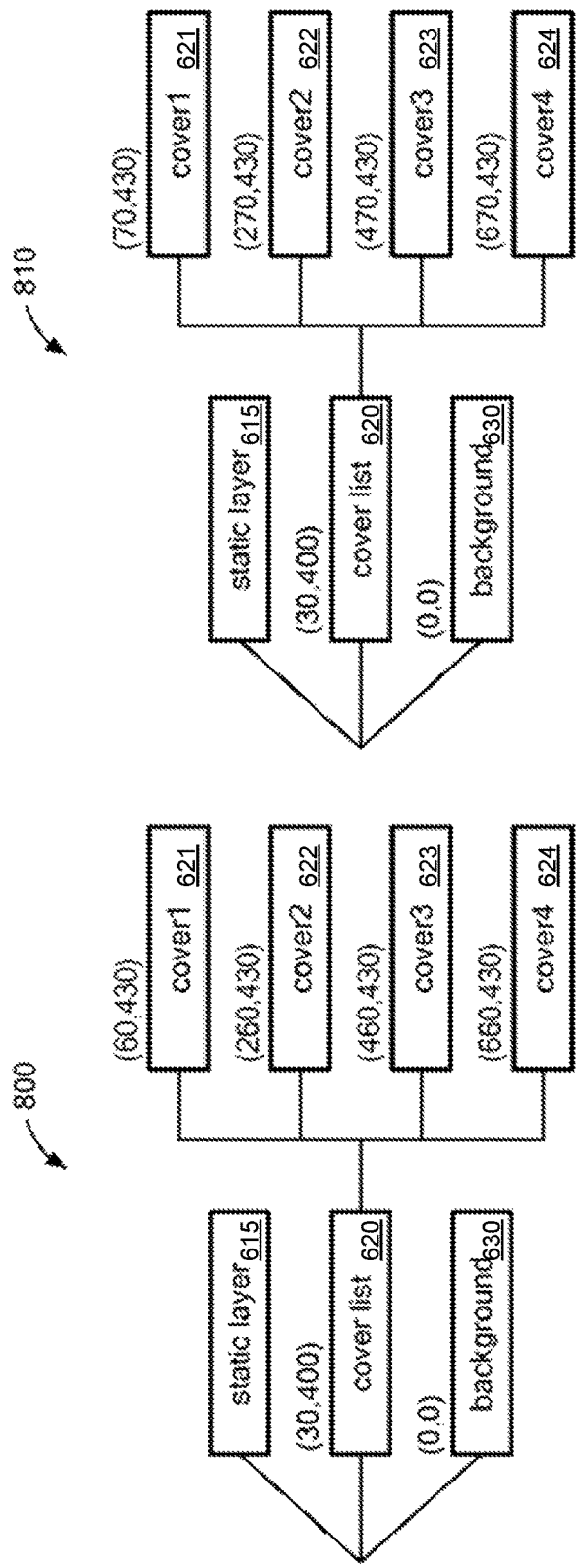
FIG. 8 shows a previous scene graph state and a current scene graph state in accordance with some embodiments.

FIG. 8 shows a previous scene graph state 800 and a current scene graph state 810 where the previous scene graph state is on the left and the current scene graph state is on the right. As shown, in both scene graph states there are three layers: a static layer 615, a cover list layer 620, and a background layer 630, which are all coupled to the head node. The cover list layer has an additional four objects (cover1 621, cover2 622, cover3 623, and cover 4 624) at a lower sub-layer. In accordance with some embodiments, the scene graph states are compared, where for example the previous transformation matrix is subtracted from the current transformation matrix. This yields the motion of the objects relative to their previous position. It is thus discovered that cover1 621, cover2 622, cover3 623, and cover 4 624 have moved 10 units in the 'x' axis direction (e.g., cover1 621 moves from 60,430 to 70,430 etc.) It is then determined which macroblocks are covered by the new positions of the covers, and a motion vector is set to (10, 0) for each of these macroblocks.

The scene graph comparison between the previous scene graph and the current scene graph may be performed in the following manner wherein the scene graph is transformed from a 3D to a 2D space. A node in a scene graph corresponds to an object having a texture (2D bitmap) and a transformation indicating how that object is floating in space. It also contains the z-order (i.e., the absolute order to render things). In OpenGL the transformation consists of a matrix:

m[0] m[4] m[8] m[12]
m[1] m[5] m[9] m[13]
m[2] m[6] m[10] m[14]
m[3] m[7] m[11] m[15]

This transformation is applied to an element 'a' in a 3D space by matrix multiplication. The element 'a' is identified by four points: the origin and the three top positions of the object in x, y and z direction. The bottom row elements m[12], m[13] and m[14] specify translation in 3D space. Elements m[0], m[4], m[8], m[1], m[5], m[9], m[2], m[6], and m[10] specify the three top positions of an object (i.e., the furthest point out in x, y, and z directions) where that particular point will end up by using matrix multiplication. This allows for object or frame rotation, slanting, shearing, shrinking, zooming, and translation etc. and repositioning of the object in world space at any time.

When two transformations have been applied to an object per matrix 'm' (from the previous scene graph) and 'n' (from the current scene graph), the "difference" between the two is m−n, as determined through matrix subtraction. The result of the matrix subtraction gives the amount of rotation, slanting, shearing, shrinking, zooming, translation etc. that has been performed to the object between the previous frame and the current frame.

Projecting a 3D image onto a 2D surface is well known in the art. In one embodiment, the system first calculates projections of the 3D scene graphs onto a 2D plane, where the transformation matrices also become 2D. The motion vector (obtained by subtracting the transformation matrices) is then 2D and can be directly applied by the MPEG encoder. One motion vector per (destination) macroblock is passed, if motion was detected. The motion vector has a defined (x, y) direction, having a certain length that indicates direction and distance covered between the current frame and the previous frame. The encoder then assumes that the reference information for a macroblock is in the reverse direction of the motion vector.

Figure 9:
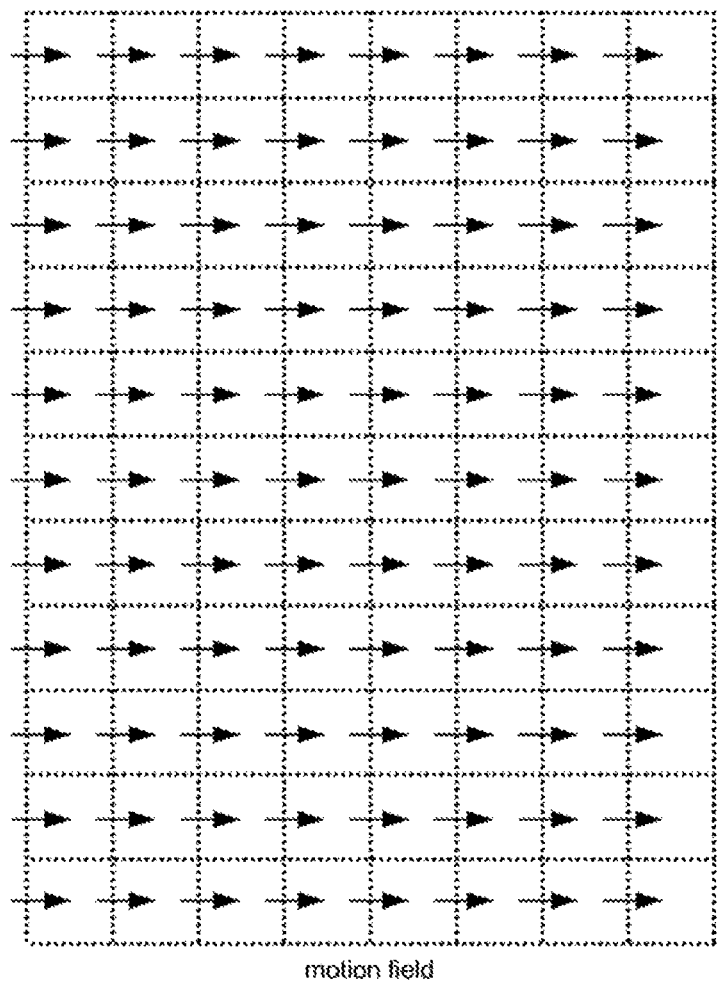
FIG. 9 shows a motion field between a first scene graph state and a second scene graph state in accordance with some embodiments.

FIG. 9 is an exemplary motion field that shows all of the motion vectors for macroblocks in a scene wherein all of the macroblocks have moved 10 units to the right. This might happen in a scrolling scenario where a user provides user input wanting to move elements on the display screen to the right. The user may be viewing a television or other device and may send a control signal to the server that is indicative of a right arrow key or a rightward swipe. This control signal is received by the system and the control signal is used to generate a scene graph update within the application execution environment 110. Once a scene graph is created, the video construction module creates an encoded video signal that is transmitted from the server to the client device and then displayed on the client device. The provided motion field is the result of the scene graph state comparison between the previous and current scene graph states wherein the transformation matrices are subtracted.

Figure 10:
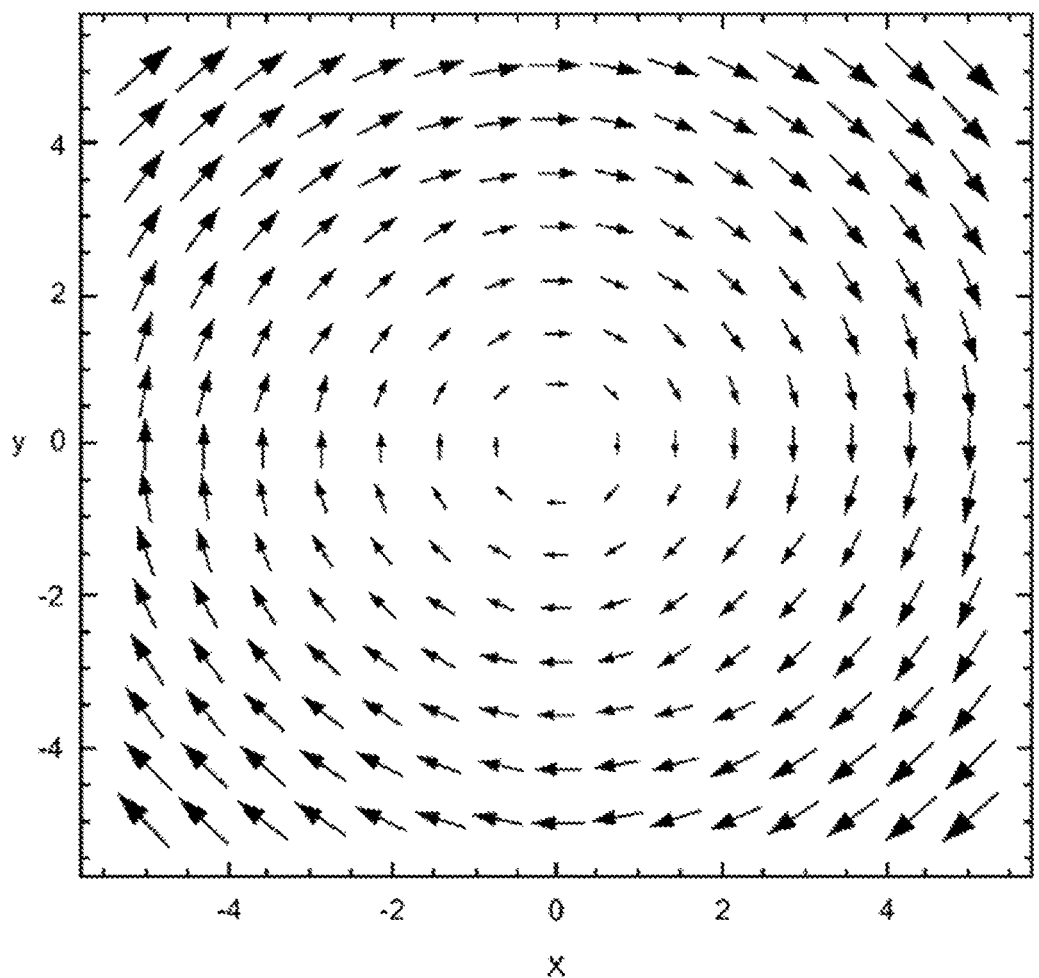
FIG. 10 shows a motion field for the rotation of each macroblock of an image in accordance with some embodiments.

FIG. 10 shows a motion field for the rotation of an image. For this example, the transformation matrices of the previous and current scene graph states are subtracted and the motion vectors indicate that there is a rotation of the objects within the image. Note that the macroblocks themselves are not rotated; consequently, there will be a residual error after the motion has been compensated. Thus, residual error calculations as are known in the art for motion vectors may be calculated. The residual error may be graphical information. This may be performed by the MPEG encoder or by the video construction module. Slanting, shearing, and other movements will result in other motion fields.

In some embodiments, hashing and caching of dirty rectangles is performed on individual layers of a scene graph state instead of on 2D projections of these layers. Hashing and caching of dirty rectangles on individual layers of a scene graph state is more efficient compared to hashing and caching of 2D projections of these layers, because the layers represent independent changes.

Figure 15:
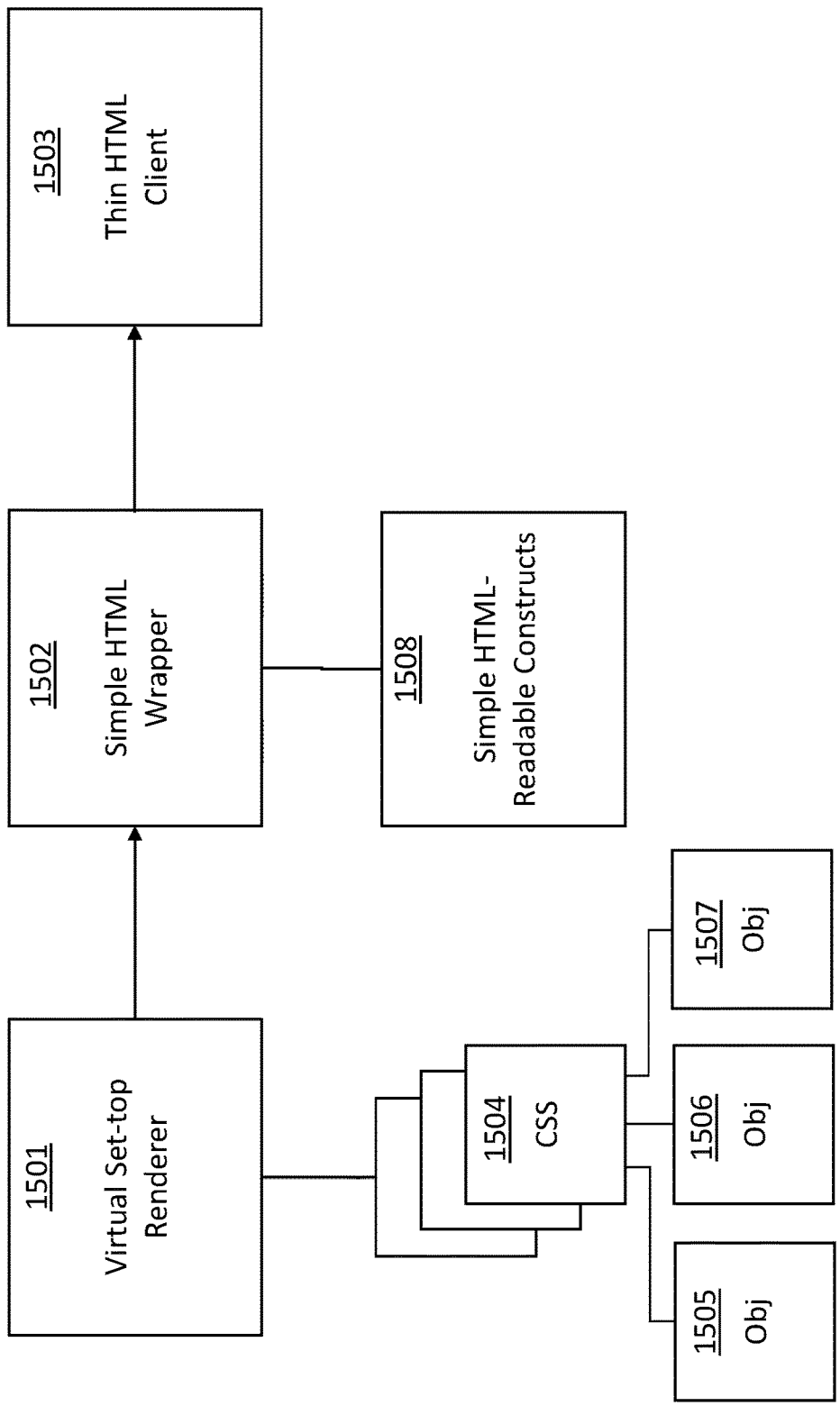
FIG. 15 shows a block diagram representing a method of translating complex applications into simplified HTML intended for transmission to a downstream client device via a network, in accordance with some embodiments.

FIG. 15 represents a method of translating a complex interactive application into simplified HTML-compatible components (e.g., components executable by a plurality of browsers and/or other applications from multiple manufacturers, such as HTML4-compatible components or components compatible with HTML5 without one or more extensions) in accordance with some embodiments. The method of FIG. 15 is performed in the cloud (i.e., at a server) and the resulting simplified HTML wrapper 1502 is sent to a thin HTML client 1503. A virtual set-top renderer 1501 traverses the Document Object Model (DOM) tree that is used to render the image for presentation to the user. In the process of traversing the DOM tree, complex instructions are translated from, for instance, HTML5 language to simplified instructions that can be interpreted by a simplified HTML browser that may not be capable of interpreting HTML5 or advanced forms of JavaScript. In some embodiments, the translation process is accomplished by traversing Cascaded Style Sheet (CSS) instructions 1504 for objects 1505, 1506, 1507.

Figure 16:
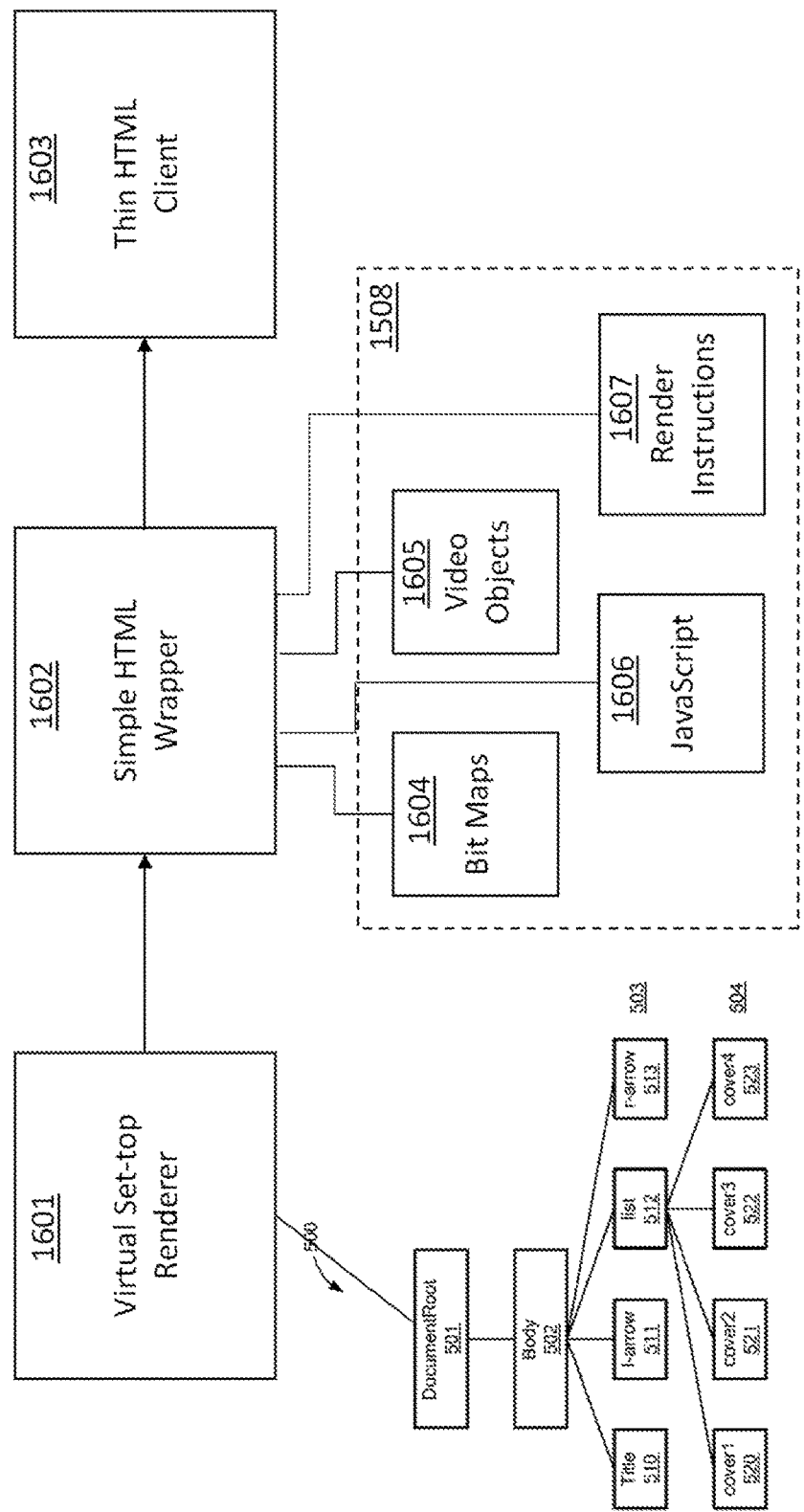
FIG. 16 shows a block diagram showing a hierarchy of the complex application and details of a complex-to-simple translator for sending simplified HTML to a client device in accordance with some embodiments.

FIG. 16 provides more detail of the process of FIG. 15. The elements of FIG. 5 are shown in the context of the functions of FIG. 15. The virtual set-top renderer 1601 enters the DOM tree 500 and traverses the structure via the document root 501 through the document body 502 to layers 503 and 504. This process allows changes in the scene as presented to the user to be determined and the changes to be mapped to related functions that can be handed off to a simplified (i.e., simple) HTML Wrapper 1602 (e.g., simplified HTML Wrapper 1502, FIG. 15), which processes the changes and creates a plurality of processes (HTML-readable constructs 1508) each capable of being interpreted by a simplified HTML browser. In this context, the term "simplified HTML browser" may refer to a browser not capable of interpreting HTML5 constructs or other advanced HTML and/or JavaScript extensions (e.g., j Query, among others). Bit maps 1604, video objects 1605, JavaScript 1606, and Render Instructions 1607 are among the methods employed to encapsulate the complex methods of HTML5 and its related family of JavaScript extensions. The simplified HTML Wrapper 1502/1602 is sent to a thin HTML client 1503/1603 running on a client device.

Figure 17:
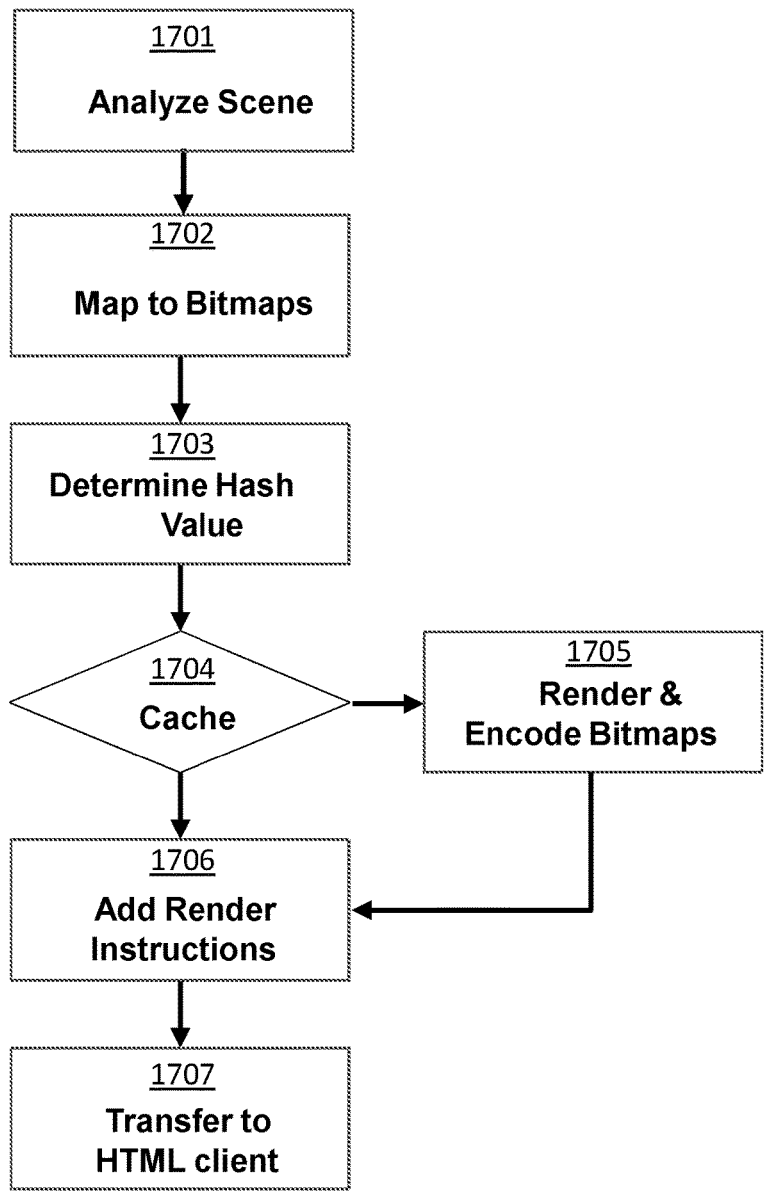
FIG. 17 is a flow chart of a method of translating complex applications to simplified HTML in accordance with some embodiments.

FIG. 17 is a flow chart showing a method of translating scene graph information of a complex user application language into reduced-complexity, simplified HTML instructions, in accordance with some embodiments. A scene (i.e., an image) is analyzed in step 1701 and mapped to bitmaps in step 1702. A hash value corresponding to a respective bitmap is determined in step 1703. In step 1704, the cache is checked to see if there is a match for the hash value (i.e., if the cache stores a rendered and encoded version of the bitmap). If not, the respective bitmap is rendered and encoded in step 1705. If so, the version from the bitmap is added to the render instructions in step 1706. The instructions are sent to the simplified HTML client in step 1707.

Systems and methods are thus provided for creating a virtual set-top user interface on a remote server and translating the complex graphics and video images of the remote interface to simplified HTML commands that can be rendered by multiple versions (e.g., any version) of an HTML client program. The information to convey to the target simplified client from the remote user interface is derived by creating a composited video frame sequence in the remote virtual set-top user interface application. A current scene state for an application may be compared to a previous scene state, wherein each scene state includes a plurality of objects. A video construction engine may determine if properties of one or more objects have changed based upon a comparison of the scene states. If properties of one or more objects have changed, the delta between the object's states is determined and used by a fragment encoding module if the fragment has not been encoded before. If the fragment has been encoded before and stored, this previously determined fragment information may be reused. The information is used to define, for example, the motion vectors for use by the fragment encoding module in construction of the fragments to be used by a stitching module, such as used for MPEG or H.264/5 encoded video, to build a composited video-frame sequence. Representative bit maps of the video-frame sequence, appropriately transcoded bit maps, JavaScript, certain rendering instructions, and/or other HTML constructs may be encapsulated in simplified HTML-coded instructions and conveyed to the target client HTML-capable rendering software application (i.e., the HTML client), such as an HTML browser software program, with the assurance that the HTML client (e.g., regardless of generation) will be able to decode and render the received commands.

It can be seen from these figures and the description above that the invention presents a significant improvement in providing a practical means of conveying a complex user-interactive application often rendered in complex and advanced HTML language, such as HTML5, to a simplified (e.g., HTML4-compatible, or compatible with HTML5 without one or more extensions) HTML browser environment found on a wide variety of consumer devices such as smart TVs, mobile phones, tablets, and low-cost (e.g., thin-client) Internet set-top boxes.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof In an embodiment of the present invention, predominantly all of the reordering logic may be implemented as a set of computer program instructions that is converted into a computer executable form, stored as such in a computer-readable medium (e.g., a non-transitory computer-readable storage medium), and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and inter-networking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been described with reference to specific embodiments, it will be understood by those skilled in the art that various changes in form and detail may be made therein without departing from the spirit and scope of the invention as defined by the appended clauses.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A method, comprising, at a server remote from a client device:
   executing an HTML-based virtual client application;
   using the HTML-based virtual client application to:
   traverse a Document Object Model (DOM) tree to identify differences between two sequential images in sequential video frames of a sequence of video frames to render a rendered image corresponding to a video frame, the rendered image associated with HTML commands; and
   generate an HTML wrapper for the rendered image that includes data encoded in accordance with the differences identified by traversing the DOM tree, comprising converting the HTML commands to HTML primitives, wherein the HTML primitives are selected from a subset of available HTML commands; and
   sending the HTML wrapper to the client device to be processed by an HTML-based application on the client device to enable the image to be displayed at a display coupled to the client device.

2. The method of claim 1, wherein:
   the virtual client application comprises a virtual set-top user-interface application; and
   the image comprises a user interface.

3. The method of claim 1, wherein:
   one or more of the HTML commands are not supported by the HTML-based application on the client device; and
   the HTML primitives are supported by the HTML-based application on the client device.

4. The method of claim 1, wherein:
   the HTML-based virtual client application comprises a first browser that supports the HTML commands; and
   the HTML-based application on the client device comprises a second browser that does not support one or more of the HTML commands.

5. The method of claim 4, wherein:
   the second browser supports the HTML primitives.

6. The method of claim 1, wherein:
the HTML commands are supported by HTML5;
one or more of the HTML commands are not supported by a version of HTML preceding HTML5; and
the HTML primitives are supported by the version of HTML preceding HTML5.

7. The method of claim 6, wherein:
one or more of the HTML commands are not supported by HTML4; and
the HTML primitives are supported by HTML4.

8. The method of claim 6, wherein:
the HTML-based virtual client application is HTML5-compatible; and
the HTML-based application on the client device is not HTML5-compatible.

9. The method of claim 1, wherein:
the HTML commands are supported by HTML5 with one or more extensions;
one or more of the HTML commands are not supported by HTML5 without the one or more extensions; and
the HTML primitives are supported by HTML5 without the one or more extensions.

10. The method of claim 1, wherein converting the HTML commands to the HTML primitives is performed while traversing the DOM tree.

11. The method of claim 1, wherein the client device is selected from the group consisting of a set-top box, a television, a mobile phone, a tablet computer, and a personal computer.

12. A server system, comprising:
one or more processors; and
memory storing one or more programs for execution by the one or more processors, the one or more programs including instructions for:
  executing an HTML-based virtual client application;
  using the HTML-based virtual client application to:
    traverse a Document Object Model (DOM) tree to identify differences between two sequential images in sequential video frames of a sequence of video frames to render a rendered image corresponding to a video frame, the rendered image associated with HTML commands; and
    generate an HTML wrapper for the rendered image that includes data encoded in accordance with the differences identified by traversing the DOM tree, comprising converting the HTML commands to HTML primitives, wherein the HTML primitives are selected from a subset of available HTML commands; and
  sending the HTML wrapper to the client device to be processed by an HTML-based application on the client device to enable the image to be displayed at a display coupled to the client device.

13. A non-transitory computer-readable storage medium, storing one or more programs configured for execution by one or more processors of a server system, the one or more programs including instructions for:
  executing an HTML-based virtual client application;
  using the HTML-based virtual client application to:
    traverse a Document Object Model (DOM) tree to identify differences between two sequential images in sequential video frames of a sequence of video frames to render a rendered image corresponding to a video frame, the rendered image associated with HTML commands; and
    generate an HTML wrapper for the rendered image that includes data encoded in accordance with the differences identified by traversing the DOM tree, comprising converting the HTML commands to HTML primitives, wherein the HTML primitives are selected from a subset of available HTML commands; and
  sending the HTML wrapper to the client device to be processed by an HTML-based application on the client device to enable the image to be displayed at a display coupled to the client device.

* * * * *